Patented Jan. 22, 1952

2,583,426

UNITED STATES PATENT OFFICE 2,583,426

PRODUCTION OF ALCOHOLS

John C. Hillyer and James T. Edmonds, Jr., Bartlesville, Okla., assignors to Phillips Petroleum Company, a corporation of Delaware No Drawing. Application April 19, 1948,
Serial No. 21,862

13 Claims. (Cl. 260—632)

This invention relates to the production of alcohols, and more specifically it relates to a process for the production of saturated and unsaturated alcohols containing five or more carbon atoms to the molecule.

Alcohols of five or more carbon atoms to the molecule have numerous uses in the chemical industries. Typical of these uses are their utilization as solvents or as starting materials for the synthesis of valuable organic chemicals, pharmaceuticals, and the like. Heretofore a principal source of alcohols containing more than four carbon atoms to the molecule has been from the reduction of fatty acids obtained from naturally occurring animal and vegetable oils. However, the alcohols obtained from such sources are principally aliphatic compounds containing an even number of carbon atoms to the molecule. Aralkyl primary alcohols and alcohols containing an odd number of carbon atoms to the molecule have generally been produced by synthetic methods, often involving expensive or inefficient procedures.

It is an object of this invention to provide an efficient and inexpensive method for producing saturated and unsaturated alcohols, containing five or more carbon atoms to the molecule. It is a further object to provide a method for producing these alcohols by employing an unsaturated epoxy compound as a reactant. It is a further object to provide a method for producing these alcohols by the interaction of an unsaturated epoxy compound with a Grignard reagent. A still further object is to obtain alcohols, and particularly primary alcohols, containing five or more carbon atoms and having one degree of unsaturation. Additional objects will appear from the disclosure that follows.

We have discovered a method for the production of unsaturated alcohols containing at least five carbon atoms to the molecule from the interaction of unsaturated epoxy compounds with Grignard reagents. By the process of our invention a wide variety of alcohols can be produced, including both aralkyl and aliphatic compounds. The alcohols produced in our process will contain one degree of unsaturation and can be used as such, or converted to the corresponding saturated alcohol by a simple hydrogenation step. In accordance with the process, alkyl or aralkyl Grignard reagents are reacted with unsaturated epoxy compounds to produce corresponding unsaturated alcohols.

The reactions for the production of a primary alcohol according to our process can be expressed by the following equations:

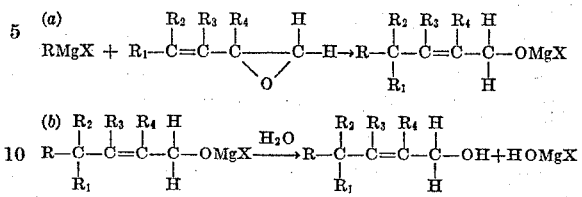

wherein X represents a halogen radical, R may be an alkyl radical or an alkyl radical having one or more aromatic substituents and $R_1$, $R_2$, $R_3$ and $R_4$ are hydrogen or alkyl radicals. The epoxy compound employed will usually be derived from a conjugated diolefin, but by whatever process it is produced, the basic unit will be the group

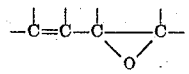

and it will generally contain a maximum of ten carbon atoms.

The use of unsaturated epoxy compounds is an important feature of our invention. Specifically, if a saturated epoxy compound were employed to prepare a primary alcohol, mixtures of primary and secondary alcohols often result, but, on the other hand, we have discovered that with an unsaturated epoxy compound as a starting material, the primary alcohol is substantially exclusively obtained. For example, according to our process methyl, ethyl, or propyl Grignard reagents can be reacted with, say, butadiene monoxide and hydrolyzed to produce normal straight chain unsaturated alcohols of five, six or seven carbon atoms respectively. Other Grignard reagents may be employed in a similar manner. Examples of these other reagents are those containing magnesium halides attached to alkyl radicals higher than the propyl radical and to alkyl radicals containing one or more aromatic substituents. By hydrogenation the alcohols thus produced may be reduced to the corresponding saturated products.

The use of Grignard reagents in the synthesis of alcohols has long been known and practiced in the art. However, the synthesis of a primary alcohol by this method has heretofore been effected by reacting a Grignard reagent with the carbonyl group of a compound having no attached substituent groups such as formaldehyde. Thus the carbon chain is lengthened by a single carbon atom in the reaction. When operating according to our novel process, the carbon chain is lengthened by at least four carbon atoms in a single step.

It is a surprising feature of our process that the hydrocarbon radical from the Grignard reagent is attached to the fourth carbon atom of the basic unsaturated epoxy unit, rather than to one of the carbon atoms within the epoxide ring. In numbering the carbon atoms in the epoxy unit we prefer to start at the terminal carbon atom of the epoxide ring and then proceed toward the opposite end of the chain of carbon atoms. A further unexpected feature of the present invention lies in the manner in which the epoxide ring is opened. The bond between the oxygen atom and the second carbon atom breaks, thus causing the reaction to proceed to the formation of the complex shown in Equation a substantially exclusively and leading to the production of the primary alcohol, in Equation b no detectable amount of substitution being effected on the second carbon atom to form secondary alcohols when hydrolyzed.

In the practice of our invention, the desired Grignard reagent is prepared in the usual manner, using a thoroughly dried reactor from which moisture is excluded by conventional means. When the reagent has been prepared, an epoxy compound, such as for example, butadiene monoxide, admixed with a solvent, for example, an approximately equal volume of anhydrous ether is added over a period of from two to four hours. The ratio of epoxy compound to Grignard reagent will preferably be about mol for mol, although an excess of the Grignard reagent may be used, say about 0.25 to 0.50 mol. The reactor is cooled to 0° C. during the addition of the epoxy compound and held at this temperature with efficient stirring for a period of from two to four hours after the addition is complete. The complex thus formed is then hydrolyzed by the addition of water, or a dilute solution of sulfuric acid or ammonium chloride. The ether layer is then separated, dried, and distilled.

The preferred temperature range for effecting the reaction between the Grignard reagent and the epoxy compound is −20° to +10° C., but this range is not critical. Temperatures outside this range may be used while still remaining within the scope of this invention.

The epoxy compounds employed may be unsaturated aliphatic epoxy compounds having four or more carbon atoms such as butadiene monoxide, piperylene monoxide, isoprene monoxide and the like. These starting materials may be obtained from any suitable source. We have found it convenient to prepare them from the corresponding conjugated diolefins by treatment with calcium hypochlorite in the presence of carbon dioxide and subsequent alkaline hydrolysis of the chlorohydrin so formed.

The foregoing disclosure has related particularly to the production of primary alcohols. However, by employing an unsaturated epoxy compound wherein the basic unit

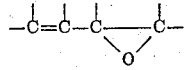

is substituted by one or two alkyl groups on the terminal carbon atom of the epoxy ring, the corresponding secondary or tertiary alcohols can be produced. Such extension of our process is to be considered within the scope of the invention.

*Example I*

A three-necked flask was fitted with a mercury sealed stirrer, a reflux condenser, and an addition funnel. Calcium chloride tubes were attached to the condenser and addition funnel to exclude moisture. One hundred milliliters of anhydrous ether was introduced into the flask together with 3.6 grams of magnesium metal and 16.3 grams of ethyl bromide. The flask was cooled in an ice bath and the reactants stirred until the magnesium was disintegrated.

To the Grignard reagent thus prepared was added 10.5 grams of butadiene monoxide in an equal volume of anhydrous ether, the temperature being held at 0° C. during the addition which was made over a period of about three hours. After the mixture had been stirred for two hours at 0° C. the complex was hydrolyzed by adding 100 cc. of 15 per cent sulfuric acid. The ether layer was then separated, dried over solid calcium chloride and distilled to provide 8.62 grams, a yield of 57.5 per cent, of 1-hydroxy-2-hexene. Physical properties of the product were: B. P. 306° F.; index of refraction $N_D^{20} 1.4340$; density $$d_4^{25} = 0.8417$$

During the distillation step no secondary alcohols were found in the reaction products.

*Example II*

The experiment of Example I was repeated using a Grignard reagent prepared from isopropyl chloride. Hydrolysis was effected by using the calculated amount of 30 per cent ammonium chloride. A yield of 59.6 per cent, based on theoretical, of 1-hydroxy-5-methyl-2-hexene was obtained. Properties of the product were: B. P. 315° F.; index of refraction $N_D^{20} 1.4371$; density $$d_4^{25}\ 0.8461$$

Again no secondary alcohols were found during the distillation step.

*Example III*

The experiment of Example I was repeated using a Grignard reagent prepared from methyl bromide. Hydrolysis was effected by adding the theoretical amount of 15 per cent sulfuric acid. Yield of 1-hydroxy-2-pentene was 55 per cent. Properties of the product were: B. P. 277° F.; index of refraction $N_D^{20} 1.4328$; density $$d_4^{25}\ 0.8417$$

No secondary alcohols were found during the distillation of the reaction products.

*Example IV*

The unsaturated alcohols prepared in the experiments of Examples I, II, and III were hydrogenated using Raney nickel as the catalyst. The hydrogenations were carried out in a Parr Hydrogenation apparatus under a pressure of about 30 pounds per square inch gauge. The reactions proceeded smoothly reaching completion in from one to two hours. In each instance the amount of hydrogen consumed, calculated from the pressure change in the gas cylinder, was approximately one mol for each mol of alcohol treated. Properties of the hydrogenated alcohols are shown below:

| Alcohol | B. P., °F. | $N_D^{20}$ |
|---|---|---|
| $C_5$ | 277 | 1.4089 |
| $C_6$ | 313 | |
| $C_7$ | 326 | 1.4289 |

The above examples demonstrate the operability of our invention, but the invention should not be limited to these specific examples since numerous modifications within the scope of our invention will be apparent from the disclosure.

We claim:

1. A process for producing unsaturated alcohols of the general formula

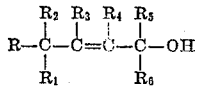

in which R represents a radical selected from the group consisting of alkyl radicals and alkyl radicals having at least one aromatic substituent and $R_1$, $R_2$, $R_3$, $R_4$, $R_5$, and $R_6$ represent radicals selected from the group consisting of hydrogen and alkyl radicals, which comprises contacting an epoxy compound having olefinic unsaturation and having the general formula

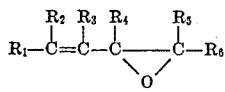

in which $R_1$, $R_2$, $R_3$, $R_4$, $R_5$ and $R_6$ represent radicals selected from the group consisting of hydrogen and alkyl radicals, with a Grignard reagent of the general formula RMgX in which X represents a halogen radical and R represents a radical selected from the group consisting of alkyl radicals and alkyl radicals having at least one aromatic substituent to form the corresponding addition compound thereof and hydrolyzing said addition compound.

2. A process for producing unsaturated primary alcohols of the general formula

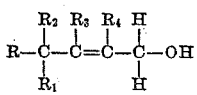

in which R represents a radical selected from the group consisting of alkyl radicals and alkyl radicals having at least one aromatic substituent and $R_1$, $R_2$, $R_3$ and $R_4$ represent radicals selected from the group consisting of hydrogen and alkyl radicals, which comprises contacting an epoxy compound having olefinic unsaturation and having the general formula

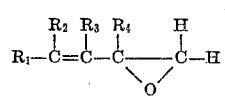

in which $R_1$, $R_2$, $R_3$ and $R_4$ represent radicals selected from the group consisting of hydrogen and alkyl radicals, with a Grignard reagent of the general formula RMgX in which X represents a halogen radical and R represents a radical selected from the group consisting of alkyl radicals and alkyl radicals having at least one aromatic substituent to form the corresponding addition compound thereof and hydrolyzing said addition compound.

3. A process according to claim 2 wherein the epoxy compound is butadiene monoxide.

4. A process according to claim 2 wherein the epoxy compound is piperylene monoxide.

5. A process according to claim 2 wherein the epoxy compound is isoprene monoxide.

6. A process according to claim 2 wherein the epoxy compound is butadiene monoxide, the Grignard reagent is ethyl magnesium bromide, and the unsaturated primary alcohol is 1-hydroxy-2-hexene.

7. A process according to claim 2 wherein the epoxy compound is butadiene monoxide, the Grignard reagent is isopropyl magnesium chloride, and the unsaturated primary alcohol is 1-hydroxy-5-methyl-2-hexene.

8. A process according to claim 2 wherein the epoxy compound is butadiene monoxide, the Grignard reagent is methyl magnesium bromide, and the unsaturated primary alcohol is 1-hydroxy-2-pentene.

9. A process for producing saturated alcohols containing at least five carbon atoms to the molecule which comprises contacting an epoxy compound having olefinic unsaturation and having the general formula

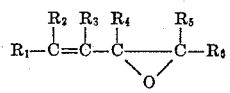

in which $R_1$, $R_2$, $R_3$, $R_4$, $R_5$ and $R_6$ represent radicals selected from the group consisting of hydrogen and alkyl radicals, with a Grignard reagent of the general formula RMgX in which X represents a halogen radical and R represents a radical selected from the group consisting of alkyl radicals and alkyl radicals having at least one aromatic substituent to form the corresponding addition compound, hydrolyzing said addition compound to form the unsaturated alcohol and hydrogenating the compound resulting from said hydrolysis reaction to form the corresponding saturated alcohol.

10. A process for producing saturated primary alcohols containing at least five carbon atoms to the molecule which comprises contacting an epoxy compound having olefinic unsaturation and having the general formula

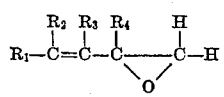

in which $R_1$, $R_2$, $R_3$ and $R_4$ represent radicals selected from the group consisting of hydrogen and alkyl radicals, with a Grignard reagent of the general formula RMgX in which X represents a halogen radical and R represents a radical selected from the group consisting of alkyl radicals and alkyl radicals having at least one aromatic substituent to form the corresponding addition compound, hydrolyzing said addition compound to form the unsaturated primary alcohol and hydrogenating the compound resulting from said hydrolysis reaction to form the corresponding saturated primary alcohol.

11. A process according to claim 9 wherein the epoxy compound is butadiene monoxide, the Grignard reagent is ethyl magnesium bromide, and the saturated primary alcohol is hexanol-1.

12. A process according to claim 9 wherein the epoxy compound is butadiene monoxide, the Grignard reagent is isopropyl magnesium chloride, and the saturated primary alcohol is 5-methyl hexanol-1.

13. A process according to claim 9 wherein the epoxy compound is butadiene monoxide, the Grignard reagent is methyl magnesium bromide, and the saturated primary alcohol is pentanol-1.

JOHN C. HILLYER.
JAMES T. EDMONDS, Jr.

REFERENCES CITED

The following references are of record in the file of this patent:

UNITED STATES PATENTS

| Number | Name | Date |
|---|---|---|
| 1,315,619 | Altwegg | Sept. 9, 1919 |

FOREIGN PATENTS

| Number | Country | Date |
|---|---|---|
| 554,310 | Germany | July 12, 1932 |

OTHER REFERENCES

Golumbic et al., Jour. Am Chem. Soc., vol. 61, 996–1000 (1939).

Rebas, Chem. Abs., vol. 22, 2920-1 (1928).

Cottle et al., Jour. Am. Chem. Soc., vol. 58, 2267–72 (1936).